United States Patent [19]
Wisnudel et al.

[11] Patent Number: 6,060,576
[45] Date of Patent: May 9, 2000

[54] METHOD FOR PREPARING COPOLYCARBONATES OF ENHANCED CRYSTALLINITY

[75] Inventors: Marc Brian Wisnudel, Clifton Park; James Day, Scotia, both of N.Y.; Gautam Chatterjee, New Delhi, India

[73] Assignee: General Electric Company, Schenectady, N.Y.

[21] Appl. No.: 09/239,482

[22] Filed: Jan. 28, 1999

[51] Int. Cl.⁷ .................................................. C08G 64/00
[52] U.S. Cl. ......................................... 528/196; 528/198
[58] Field of Search ..................... 528/196, 198

[56] References Cited

U.S. PATENT DOCUMENTS

| | | | |
|---|---|---|---|
| 4,948,871 | 8/1990 | Fukuoka et al. | 528/481 |
| 5,204,377 | 4/1993 | Fukawa et al. | 521/60 |
| 5,214,073 | 5/1993 | Fukawa et al. | 521/60 |
| 5,710,238 | 1/1998 | Sivaram et al. | 528/196 |
| 5,717,056 | 2/1998 | Varadarajan et al. | 528/196 |

OTHER PUBLICATIONS

Concurrently filed U.S. Patent Application RD–26316, entitled "Method for Preparing Polycarbonates of Enhanced Crystallinity", by James Day et al.

*Primary Examiner*—Terressa M. Boykin
*Attorney, Agent, or Firm*—Robert T. Barker; Noreen C. Johnson

[57] ABSTRACT

Copolycarbonates of enhanced crystallinity, suitable for solid state polymerization, are prepared by melt blending, under non-reactive conditions, an amorphous precursor polycarbonate such as a bisphenol A polycarbonate with one or more other monomers which may include a spiro(bis) indane bisphenol and/or a phenylindane bisphenol, optionally with a polyoxyalkylene glycol. The resulting blend is pelletized and the crystallinity of the resulting pellets is enhanced, typically by contact with an alkanol liquid or vapor.

24 Claims, No Drawings

METHOD FOR PREPARING COPOLYCARBONATES OF ENHANCED CRYSTALLINITY

BACKGROUND OF THE INVENTION

This invention relates to the preparation of copolycarbonates, and more particularly to their preparation by a method requiring enhancement of crystallinity.

Solid state polymerization (hereinafter sometimes "SSP") of polycarbonates is disclosed, for example, in U.S. Pat. Nos. 4,948,871, 5,204,377 and 5,214,073, the disclosures of which are incorporated herein. It involves a first step of forming a precursor polycarbonate, typically a prepolymer formed by melt polymerization (i.e., transesterification) of a dihydroxyaromatic compound such as bisphenol A with a diaryl carbonate such as diphenyl carbonate; a second step of enhancing the crystallinity of the prepolymer; and a third step of building the molecular weight of the crystallized prepolymer by heating to a temperature between its glass transition temperature and its melting temperature. Use of this polymerization method is of increasing interest by reason of its effectiveness and environmental benefits.

The second or crystallinity enhancement step of this method is performed, according to said patents, by solvent treatment or heat treatment. As described, the solvent treatment method may in fact employ a good or poor solvent for the prepolymer, with contact involving either the liquid or vapor form thereof. Illustrative "solvents" include aliphatic aromatic hydrocarbons, ethers, esters, ketones and halogenated aliphatic and aromatic hydrocarbons. It is sometimes considered important that the "solvent" be allowed to permeate into the prepolymer. The methods of crystallinity enhancement which involve permeation apparently require that the crystallinity of the entire prepolymer mass be increased to a value of at least 5% as determined from powder X-ray diffraction patterns.

One major use area for polycarbonates in recent years has been in the fabrication of optical data recording media, including optical disks as exemplified by compact audio disks and CD-ROM disks used in computers. The data on an optical disk are read by a plane polarized laser beam, associated with a similar reference beam polarized in a perpendicular direction. For accurate reading, it is necessary to minimize differences in phase retardation of these laser beams upon passage through the disk.

In the further development of optical disks, particularly read-write disks and disks capable of storing larger amounts of data, various physical factors become important. One such factor which is closely related to the storage capability of the disk, is its birefringence, i.e., the difference between indices of refraction of light polarized in two directions perpendicular to each other. Birefringence has several components, some of which are related to the molecular structure of the polycarbonate from which the disk is fabricated.

Copolycarbonates containing units derived from phenylindanols, particularly 6,6'-hydroxy-3,3,3',3'-tetramethyl-1,1'-spiro(bis)indane (hereinafter designated "SBI") and 1,1,3-trimethyl-3-(4-hydroxyphenyl)-5-hydroxyindane (hereinafter designated "CD-1") and their isomers, are characterized by significantly lower birefringences than homopolycarbonates of the commonly employed monomer 2,2-bis(4-hydroxyphenyl)propane, or "bisphenol A". However, it has been very difficult to prepare such copolycarbonates by SSP since the presence of SBI or CD-1 units apparently inhibits crystallinity enhancement.

A method of crystallinity enhancement which is successful with copolycarbonates of such monomers as SBI has been disclosed. It includes a step of contacting a precursor polycarbonate, most often a bisphenol A homopolycarbonate, with a monomeric or polymeric source of other structural units such as SBI, under conditions promoting incorporation of said structural units by reaction to form a precursor copolycarbonate, combined with simultaneous or subsequent conversion of said precursor copolycarbonate or either reactant to a polycarbonate of enhanced crystallinity. This method, however, is uniformly successful only when the material to be crystallized is in powder form. Since polymers are often conveniently handled as pellets rather than powder, it is of interest to provide a crystallinity enhancement method which is effective with pellets.

SUMMARY OF THE INVENTION

The present invention provides a method for enhancing the crystallinity of precursor polycarbonates containing birefringence-reducing units such as SBI or CD-1 units. The method is effective with precursor polycarbonates in pellet form.

One aspect of the invention is a method for preparing a polycarbonate precursor mixture of enhanced crystallinity which comprises melt blending, under non-reactive conditions, an amorphous precursor polycarbonate consisting essentially of structural units of the formula

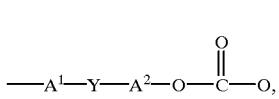

(I)

wherein each of $A^1$ and $A^2$ is independently a divalent aromatic radical and Y is a bridging radical wherein one or two atoms separate $A^1$ from $A^2$, with one or more dihydroxyorganic monomers, at least part of said monomers being a spiro(bis)indane bisphenol of the formula

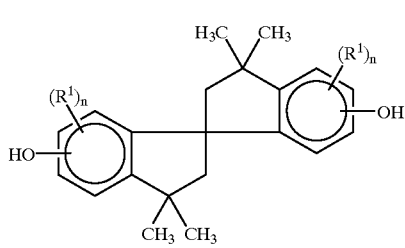

(II)

or a phenylindane bisphenol of the formula

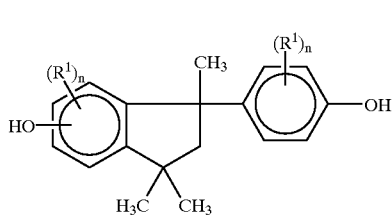

(III)

wherein $R^1$ is hydrogen or $C_{1-4}$ primary or secondary alkyl and n is 0–2, to form a monomer-polymer mixture; pelletizing said mixture; and treating the pelletized mixture to enhance the crystallinity of the polymer therein.

Another aspect is a method for preparing a copolycarbonate which comprises preparing a polycarbonate precursor mixture of enhanced crystallinity as described above, and polymerizing said polycarbonate precursor mixture by solid state polymerization.

DETAILED DESCRIPTION; PREFERRED EMBODIMENTS

The essential starting material in the method of this invention is an amorphous precursor polycarbonate, which may be a homo- or copolycarbonate provided that it consists essentially of structural units of formula I. That is, it does not contain units corresponding to any of the dihydroxyorganic monomers employed as mixture constituents according to the invention, including the bisphenols of formulas II and III.

In formula I, the $A^1$ and $A^2$ values are typically unsubstituted phenylene or substituted derivatives thereof, illustrative substituents (one or more) being alkyl, alkenyl, and halogen (particularly bromine). Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms separate $A^1$ from $A^2$. The preferred embodiment is one in which one atom separates $A^1$ from $A^2$. Illustrative radicals of this type are —O—, —S—, —SO—, —SO$_2$—, methylene, cyclohexylmethylene, 2-[2.2.1]bicycloheptyl-methylene, ethylene, isopropylidene, neopentylidene, cyclohexylidene, cyclopentadecylidene, cyclododecylidene and adamantylidene. The gem-alkylene (alkylidene) radicals are more preferred. Also included are unsaturated radicals. For reasons of availability and particular suitability for the purposes of this invention, the preferred units of formula I are derived from bisphenol A, in which Y is isopropylidene and $A^1$ and $A^2$ are each p-phenylene.

The amorphous precursor polycarbonate is often a polycarbonate oligomer of the type produced by the first step of a melt polycarbonate process or by bischloroformate oligomer preparation followed by hydrolysis and/or endcapping and isolation. Such oligomers most often have a weight average molecular weight (Mw) in the range of about 2,000–10,000 as determined by gel permeation chromatography which may be relative to polycarbonate or polystyrene, and an intrinsic viscosity in the range of about 0.06–0.30 dl/g, all intrinsic viscosity values herein being as determined in chloroform at 25° C.

The precursor polycarbonate may also be a relatively high molecular weight polycarbonate, generally having a weight average molecular weight (Mw) in the range of about 5,000–20,000, for which it is desired to increase the molecular weight still further; e.g., up to a value in the range of about 25,000–80,000. For example, polycarbonates which are off-specification for a particular application may be crystallized by the method of this invention prior to increasing its molecular weight so that they may be used in other applications.

The precursor polycarbonate may be a branched homo- or copolycarbonate, formed by the reaction of a linear polycarbonate or its precursor(s) with a branching agent such as 1,1,1-tris(4-hydroxy-phenyl)ethane. Branched copolycarbonates include oligomers and high molecular weight copolycarbonates containing units adapted to maximize solvent resistance. Hydroquinone and methylhydroquinone carbonate units are particularly suitable for this purpose, as disclosed in U.S. Pat. No. 4,920,200. Such units will typically comprise about 25–50% of total carbonate units in the polymer. Conversion to the branched homo- or copolycarbonate may precede or occur simultaneously with the conversion of the precursor polycarbonate to an enhanced crystallinity polymer.

The precursor polycarbonate may also be a recycled polycarbonate. Its method of original preparation is immaterial; i.e., recycled polycarbonate originally prepared by interfacial polymerization, by melt polymerization or from bischloroformates may be employed.

Such recycled material typically has a molecular weight which has been degraded from that of the originally polymerized material as shown by an intrinsic viscosity in the range of about 0.25–1.0 dl/g. It may be obtained from scrap polycarbonate by dissolution in a chlorinated organic solvent such as chloroform, methylene chloride or 1,2-dichloroethane followed by filtration of the insoluble material or other art-recognized procedures for separation of non-polycarbonate constituents. Other types of polycarbonate, such as interfacially prepared polycarbonate and polycarbonate extruder wastes, may also be employed as precursors.

Prior to treatment according to the invention, it is within the scope of the invention, particularly when the precursor polycarbonate is a recycled material, to dissolve it in a chlorinated hydrocarbon as solvent. Illustrative chlorinated hydrocarbons are methylene chloride, chloroform, 1,2-dichloroethane, chlorobenzene and o-dichlorobenzene. The chloroaliphatic hydrocarbons are preferred, with methylene chloride and 1,2-dichloroethane being most preferred.

Dissolution of the precursor polycarbonate in the solvent may take place at any temperature. Typical temperatures are from about 0° C. to the boiling point of the solvent, with about 20–100° C. generally being preferred. So long as an amount of solvent effective to dissolve the polycarbonate is employed, its proportion is not critical.

Such dissolution generally leaves behind various insoluble materials. The invention further contemplates removal of said insoluble materials from the polycarbonate solution. This may be achieved by such conventional operations as decantation, filtration and centrifugation.

The recycled polycarbonate is frequently associated with colored impurities, which may appear in the polycarbonate itself or in the solution thereof in the chlorinated solvent. Various embodiments of the invention, therefore, include a step of removing color from the amorphous polycarbonate solution following other removal steps. One method for color discharge is treatment while in solution with a mineral acid, preferably hydrochloric acid, said acid typically being in solution in an alkanol such as methanol. Another is contact of said solution with a solid that absorbs color bodies, such as activated charcoal or a crosslinked resin, which may be neutral or may be an ion exchange resin. Another is washing with a solution of sodium gluconate. Still another is washing of the resin, after precipitation as described hereinafter, with non-solvent in an amount sufficient to dissolve color bodies.

The solution of amorphous precursor polycarbonate is, for the most part, freed of any solvent prior to crystallinity enhancement. It is usually advantageous to precipitate the precursor polycarbonate therefrom by such art-recognized methods as anti-solvent precipitation or steam precipitation.

In the first step of the method of the invention, the amorphous precursor polycarbonate is melt blended with one or more dihydroxyorganic monomers which include birefringence-reducing monomers, especially spiro(bis indane bisphenols of formula II and phenylindane bisphenols of formula III. The preferred compounds of these structures are SBI and CD-1, in which n is 0; their isomers may also be employed but are less preferred. Most preferred is SBI.

At least one dihydroxyorganic monomer other than the birefringence-reducing species may be employed in combination with the former. These other monomers may include processability-improving monomers, typically at least one polyoxyalkylene glycol such as polyethylene glycol.

The proportion(s) of dihydroxyorganic monomer(s) melt blended with the amorphous precursor polycarbonate are effective proportions to afford a copolycarbonate having the desired properties, typically low birefringence and/or high processability. For the most part, the monomer of formula II or III will be employed in the amount of about 5–40 mole percent based on structural units in the amorphous precursor polycarbonate. Processability improving monomers such as polyethylene glycol will often be present in the amount of about 1–10 mole percent, based on structural units in the polyoxyalkylene glycol and precursor polycarbonate.

The amorphous precursor polycarbonate and the dihydroxyorganic monomer(s) are melt blended under non-reactive conditions; that is, under conditions which will not promote a chemical reaction between them. Such conditions are important since it is required that no incorporation into the polycarbonate of structural units derived from the monomer(s) take place during this step.

Melt blending may be conducted by any known batch or continuous method. Most often, continuous blending, especially extrusion, is employed at least in part. The blending temperature is typically up to 200° C., provided that non-reactive conditions are maintained.

In this regard, it should be noted that temperatures in the range of about 170–250° C. have been previously defined as "reactive". The ostensible overlap in "reactive" and "non-reactive" conditions is a result of the fact that the nature of the conditions can vary significantly with the monomer(s) employed, and the exact nature thereof can be readily determined by those skilled in the art by simple experimentation. With monomers such as SBI and CD-1, no reaction ordinarily takes place during the times characteristic of the present invention and at temperatures up to 200° C.

The product of the melt blending step is a mixture of the amorphous precursor polycarbonate and the added monomer(s). This mixture is then pelletized by conventional pelletizing operations in the second step of the method of the invention.

In the third step, the pelletized mixture is treated to enhance its crystallinity. This may be achieved by any known method, such as solvent treatment or heat treatment as disclosed in the aforementioned U.S. Pat. No. 4,948,871. It is often convenient and is particularly effective to enhance crystallinity by contacting said pelletized mixture with at least one non-solvent therefor, said non-solvent being water or a $C_{1-20}$ alkanol in the liquid or vapor state and being free from dialkyl carbonate, for a time effective to form a surface-crystallized polycarbonate and, typically at a contact temperature which is at least 75° C. and which is further defined by the relationship $$T_c \geq T_b - Z,$$

wherein $T_c$ is the contact temperature, $T_b$ is the boiling point of the alkanol at the contact pressure employed, both in degrees C, and z is a constant with a maximum value of z is 60.

Crystallinity may also be enhanced by contact, typically at a temperature above about 110°C, with one or more catalysts as disclosed in U.S. Pat. No. 5,717,056. The disclosures of both of the aforementioned patents are incorporated by reference herein. The catalysts used may include alkali metal hydroxides and alkoxides; quaternary bisphenolates; tetraalkylammonium hydroxides, alkoxides and carboxylates; and tetraalkylphosphonium hydroxides, alkoxides and carboxylates. For the most part, however, the presence of catalysts is not necessary and is not preferred.

The effect of the crystallinity enhancement step is to partially crystallize the polycarbonate precursor in the mixture. It is sufficient to crystallize only the outer shell of the pellets of the polycarbonate precursor mixture.

An often preferred aspect of the invention includes an SSP reaction following crystallinity enhancement. The SSP reaction may be effected at a temperature above the glass transition temperature of the precursor polycarbonate and below its melting temperature. In general, temperatures in the range of about 150–270° and especially about 180–250° C. are suitable. As disclosed in the aforementioned U.S. Pat. Nos. 4.948,871, 5,204,377 and 5,717,056, SSP may be conducted in the presence of at least one catalyst. Suitable catalysts include those known in the art to be effective in such polycarbonate reactions as melt polymerization, redistribution, equilibration and solid state polymerization. However, catalysts are not required for the present invention and their presence is frequently not preferred.

The product of the SSP reaction is a copolymer or terpolymer of higher molecular weight than the precursor polycarbonate, in which the added monomer(s) have been incorporated into the chain thereof.

Solid state polymerization may be conducted in a mixer capable of producing intimate gas-solid contact, such as a fixed bed, fluidized bed or paddle mixer, in contact with an inert gas such as nitrogen or argon which serves as the fluidizing gas if a fluidized bed is employed. Said inert gas may serve one or both of the purposes of fluidizing the mixture and volatilizing and removing by-products, including water, hydroxyaromatic compound and any volatile carbonate formed as a by-product. Programmed heating may be advantageously employed. As an alternative to conditions of intimate gas-solid contact, the polymerization may be conducted at reduced pressure, typically less than about 100 torr, preferably with efficient mixing.

The method of the invention is illustrated by the following examples. Mw values were determined by gel permeation chromatography relative to polystyrene.

EXAMPLE 1

A 1-kg portion of an amorphous bisphenol A polycarbonate oligomer having a Mw of about 8,000, prepared by a transesterification reaction of bisphenol A with diphenyl carbonate, was blended with 100 g of SBI in a Henschel mixer. The resulting blend was extruded on a twin screw extruder at 180° C. The extrudate was pelletized and the pellets were exposed to methanol vapor at 100° C. for one hour. The resulting enhanced crystallinity material was subjected to SSP conditions by heating in a fluidized bed reactor at 180° C. for 2 hours, 200° C. for 2 hours, 210° C. for 2 hours, 220° C. for 2 hours, 230° C. for 2 hours and 240° C. for 6 hours. The resulting copolycarbonate had a Mw of 31,100, a Tg of 148.7° C. and an onset melt temperature of 245° C.

EXAMPLE 2

A commercially available bisphenol A polycarbonate having a Mw of about 52,000 was blended at 100° C. in a Henschel mixer with SBI and a PEG having a molecular weight of about 400 to form a powder having proportions of bisphenol A, SBI and PEG of 79:18:3, with the PEG proportions being calculated on the basis of the molecular weight of 400. The resulting mixture was extruded on a twin screw extruder at 180° C., pelletized, crystallized and polymerized as described in Example 1, to yield a terpolycarbonate having a Mw of 38,200 and a Tg of 138° C.

What is claimed is:

1. A method for preparing a polycarbonate precursor mixture of enhanced crystallinity which comprises melt blending, under non-reactive conditions, an amorphous precursor polycarbonate consisting essentially of structural units of the formula

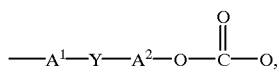
(I)

wherein each of $A^1$ and $A^2$ is independently a divalent aromatic radical and Y is a bridging radical wherein one or two atoms separate $A^1$ from $A^2$, with one or more dihydroxyorganic monomers selected from the group consisting of a spiro(bis)indane bisphenol of the formula,

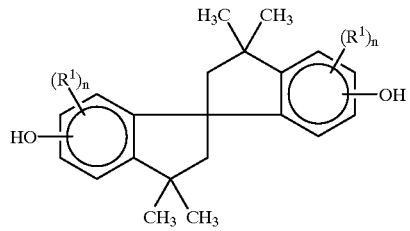
(II)

a phenylindane bisphenol of the formula

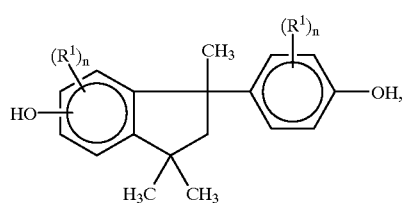
(III)

a mixture of (II) or (III) with another dihydroxy organic monomer and a mixture of (II) and (III) with another dihydroxy organic monomer
wherein $R^1$ is hydrogen or $C_{1-4}$ primary or secondary alkyl and n is 0–2,
to form a monomer-polymer mixture; pelletizing said mixture; and treating the pelletized mixture to enhance the crystallinity of the polymer therein.

2. A method according to claim 1 which is conducted in the absence of catalyst.

3. A method according to claim 1 wherein the amorphous precursor polycarbonate is a bisphenol A polycarbonate.

4. A method according to claim 1 wherein the amorphous precursor polycarbonate is a polycarbonate oligomer.

5. A method according to claim 1 wherein the amorphous precursor polycarbonate is a high molecular weight polycarbonate.

6. A method according to claim 1 wherein the amorphous precursor polycarbonate is a branched homo- or copolycarbonate.

7. A method according to claim 1 wherein the amorphous precursor polycarbonate is a recycled polycarbonate.

8. A method according to claim 1 wherein the dihydroxyorganic monomers include 6,6'-hydroxy-3,3,3',3'-tetramethyl-1,1'-spiro(bis)indane.

9. A method according to claim 1 wherein the dihydroxyorganic monomers further include at least one polyoxyalkylene glycol.

10. A method according to claim 9 wherein the polyoxyalkylene glycol is polyethylene glycol.

11. A method according to claim 2 wherein crystallinity enhancement comprises exposing said pellets to the liquid or vapor of an alkanol.

12. A method according to claim 11 wherein the alkanol is methanol and contact of said pellets with said methanol is at a contact temperature which is at least 75° C. and which is further defined by the relationship $$T_c \geq T_b - Z,$$

wherein $T_c$ is the contact temperature, $T_b$ is the boiling point of the alkanol at the contact pressure employed, both in degrees C, and z is a constant with a maximum value of z is 60.

13. A method for preparing a copolycarbonate which comprises: preparing a polycarbonate precursor mixture of enhanced crystallinity by melt blending, under non-reactive conditions, an amorphous precursor polycarbonate consisting essentially of structural units of the formula

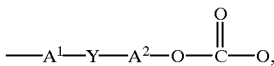
(I)

wherein each of $A^1$ and $A^2$ is independently a divalent aromatic radical and Y is a bridging radical wherein one or two atoms separate $A^1$ from $A^2$, with one or more dihydroxyorganic monomers selected from the group consisting of a spiro(bis)indane bisphenol of the formula,

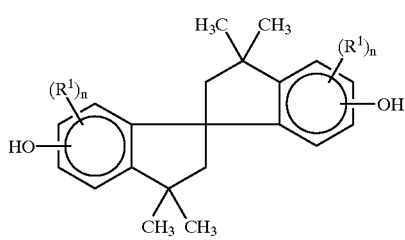
(II)

a phenylindane bisphenol of the formula

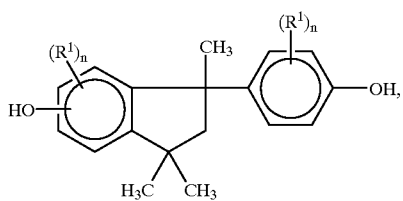

(III)

a mixture of (II) or (III) with another dihydroxy organic monomer and a mixture of (II) and (III) with another dihydroxy organic monomer
wherein $R^1$ is hydrogen or $C_{1-4}$ primary or secondary alkyl and n is 0–2, to form a monomer-polymer mixture;
   pelletizing said mixture;
   treating the pelletized mixture to enhance the crystallinity of the polymer therein; and
   polymerizing said mixture by solid state polymerization.

14. A method according to claim 13 wherein crystallinity enhancement is conducted in the absence of catalyst.

15. A method according to claim 13 wherein the amorphous precursor polycarbonate is a bisphenol A polycarbonate.

16. A method according to claim 13 wherein the dihydroxyorganic monomers include 6,6'-hydroxy-3,3,3',3'-tetramethyl-1,1'-spiro(bis)indane.

17. A method according to claim 13 wherein the dihydroxyorganic monomers further include at least one polyoxyalkylene glycol.

18. A method according to claim 17 wherein the polyoxyalkylene glycol is polyethylene glycol.

19. A method according to claim 13 wherein crystallinity enhancement comprises exposing said pellets to the liquid or vapor of an alkanol.

20. A method according to claim 19 wherein the alkanol is methanol and contact of said pellets with said methanol is at a contact temperature which is at least 75° C. and which is further defined by the relationship $$T_c \geq T_b - Z,$$

wherein $T_c$ is the contact temperature, $T_b$ is the boiling point of the alkanol at the contact pressure employed, both in degrees C, and z is a constant with a maximum value of z is 60.

21. A polycarbonate precursor mixture prepared by the method of claim 1.

22. A polycarbonate prepared by the method of claim 13.

23. An article comprising the polycarbonate of claim 22.

24. A polycarbonate prepared by the method of claim 20.

* * * * *